INVENTOR.
RICHARD WICK
FRIEDRICH BESTENREINER
ERWIN v. WASIELEWSKI

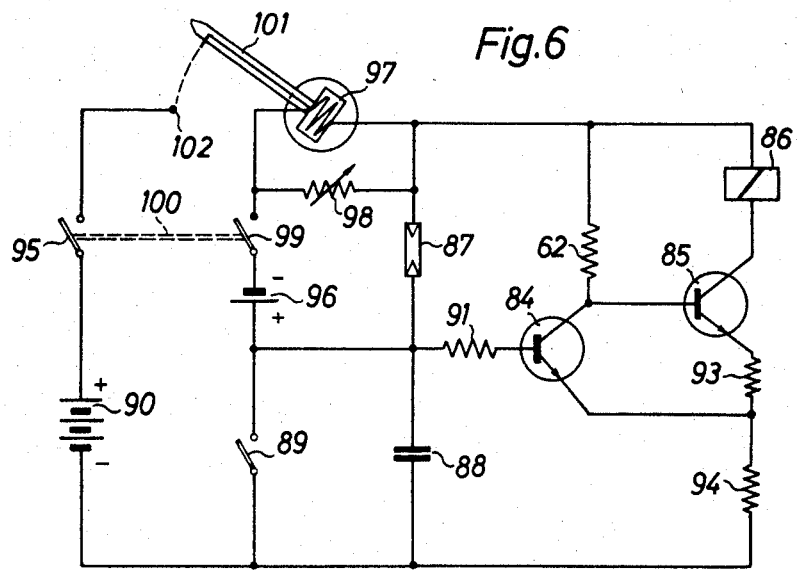
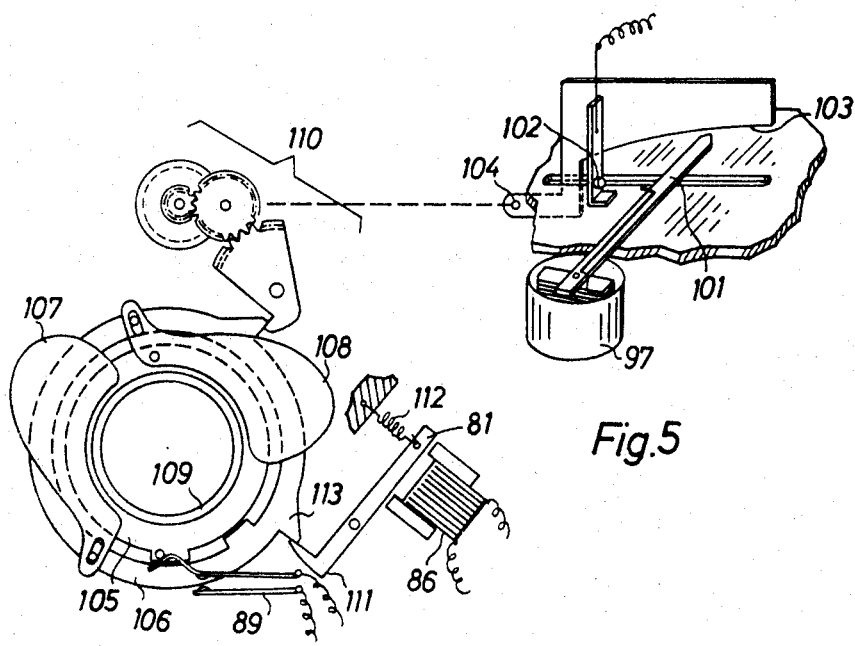

United States Patent Office 3,433,140
Patented Mar. 18, 1969

3,433,140
EXPOSURE CONTROL FOR PHOTOGRAPHIC
CAMERA
Richard Wick and Friedrich Bestenreiner, Grunwald, and Erwin Von Wasielewski, Munich, Germany, assignors to Agfa-Gevaert Aktiengesellschaft, Leverkusen, Germany
Filed Jan. 31, 1967, Ser. No. 612,877
Claims priority, application Germany, Feb. 4, 1966, A 51,505
U.S. Cl. 95—10
Int. Cl. G01j 1/44
11 Claims

ABSTRACT OF THE DISCLOSURE

A light control arrangement for photographic cameras based upon photoelectric timing circuits and electromagnets energized thereby. When the light intensity is substantially high, control is exercised over the diaphragm as well as the exposure time. When, on the other hand, the light intensity is relatively low, the exposure period is controlled through a photoelectric timing circuit. A photoelectric converter determines the intensity of the prevailing light and switches to one or the other control circuits, depending upon whether the light intensity is relatively high or low.

BACKGROUND OF THE INVENTION

Exposure control through photoelectric timing circuit as a function of film speed and constant diaphragm opening, is well known in the art. This method has the disadvantage that substantially small diaphragm openings are applied in conjunction with short exposure times, when the prevailing light intensity is relatively high and the film speed is of an intermediate value. The diaphragm openings are made especially small when high speed films are employed. Such small diaphragm openings prohibit the use of the camera without a tripod, when the light intensity is relatively low. Under these conditions, relatively long exposure periods are necessary, and therefore movement or shaking of the camera may take place if a tripod is not used.

It is also known to control automatically the diaphragm instead of the exposure time, as a function of the light intensity. At the same time, it is known to control both the diaphragm opening and the exposure time, simultaneously. These methods permit an extension of the light range wherein the camera may be applied without the use of a tripod. However, these methods do not permit the taking of exposures at extremely low light intensities, even with the use of a tripod. This is due to the condition that the conventional sensors are not operable at such lower light intensities. At the same time exposure variations are possible when the diaphragm is at its maximum. This particular arrangement may also be applied to a camera having simultaneous control over the diaphragm and the exposure time through the aid of electronic timing circuits. The variation in the exposure time must, herein, be controlled so that the proper exposure is realized when the diaphragm is varied simultaneously. The separate control of these functions will not provide satsfactory results. For example, it is not permissible to exercise timing control alone, after the maximum diaphragm opening has been attained. The control over these two parameters must be exercised simultaneously. The present invention provides for an automatically controlled camera adapted to operate without the use of a tripod within the maximum possible range. The invention also provides for an automatic light control which permits the long exposure times without being restricted by the operating limits of the available sensors.

The invention permits the user of the camera to obtain optimum results at all times when the light intensities are relatively low. When the light intensities are relatively high, the camera operates in conjunction with small diaphragm openings so that sharpness and good contrast may be attained. When the light intensities are low, long exposure periods are introduced by the invention, without the aid of the photographer.

SUMMARY OF THE INVENTION

A light control arrangement for photographic diaphragm shutters comprising, in combination, a first photoelectric control means for controlling the diaphragm of the shutter when the light intensity prevailing at the object to be photographed is substantially high, a second photoelectric control means for controlling the exposure time of the shutter when the light intensity prevailing at the object to be photographed is substantially low, and a photoelectrically operated switching means connected to the first and second photoelectric control means and exposed to the luminous intensity of the object for switching from one to the other of the photoelectric control means depending on the light intensity prevailing at the object to be photographed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 is an operational diagram of a fourth embodiment of the invention;

FIG. 6 is an electrical circuit diagram corresponding to the embodiment of FIG. 5.

DESCRIPTION OF THE PREFERRED EMBODIMENTS

Figure 1:
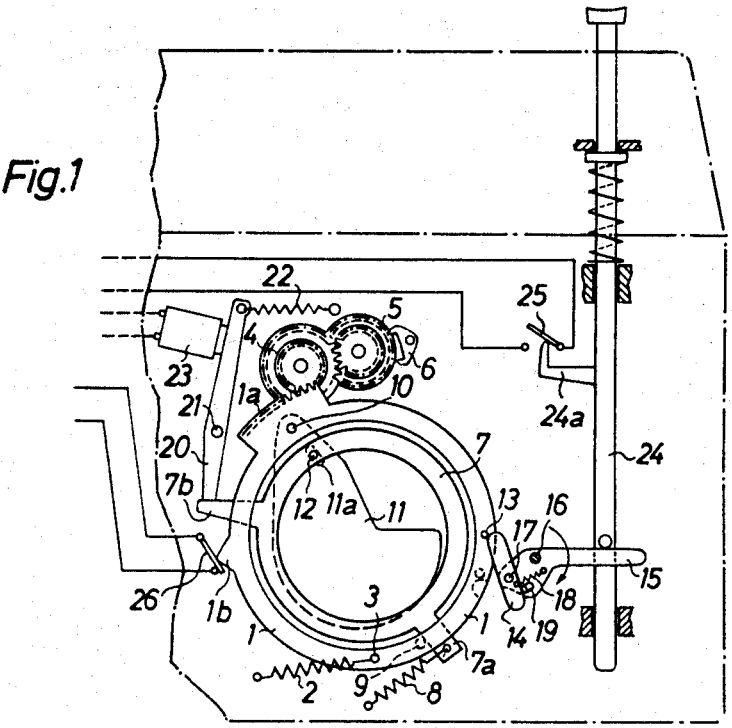
FIG. 1 shows a photographic camera with automatic light control operation of a shutter.

Referring to the drawing, FIG. 1 shows a photographic camera with a shutter having two rings. The initially operating opening ring 1 is rotatably mounted within the housing of the camera. The opening ring 1 is turned in a clockwise direction, due to the action of the tension spring 2 which is secured to a pin 3 on the ring 1. A pinion or gear 4 meshes with a gear segment 1a. The pinion 4 operates in conjunction with a commonly-known escapement mechanism comprised of a ratchet 5 and pawl 6. An idler linkage (not shown) is arranged between the pinion 4 and the ratchet wheel 5 to permit the cocking of ring 1.

A closing ring 7 is mounted outside of the opening ring 1. The closing ring is turned in a clockwise direction due to the action of the tension spring 8 secured, at one end, to the nose projection 7a of the closing ring. The nose projection 7a bears against a pin 9 mounted on the ring 1 so as to prevent the turning of the closing ring with respect to the opening ring, beyond a predetermined position.

Diaphragm blades 11 are rotatably mounted on pins 8, in the commonly-known manner, which are secured to the opening ring. The diaphragm blades 11 are coupled to the closing ring by way of the pin-slot connections 12 and 11a, respectively. For purposes of providing a clear explanation of the preferred embodiments, only one diaphragm blade 11 is shown. When the two rings are rotated with respect to each other, the diaphragm blades are swung more or less out of the optical path of the camera. As a result, it is possible to determine precisely the diaphragm opening through a specific angular rotation of the rings.

A pin 13 mounted on the ring 1 is sustained by a gripping lever 14 of a release lever 15. The release lever 15 is rotatably mounted on the pin 16 secured to the housing of the camera. The gripping lever 14, on the other hand, is mounted upon a pin 17 secured to the lever 15. Due to the action of a spring 18, the gripping lever 14 is maintained in contact with a stop pin 19. This arrangement serves the purpose of rotating the ring 1 against the action of spring 2, while release lever 15 is depressed, until the gripping lever 14 has moved outside of the path of the pin 13. After that, the spring action may return the ring, and the gripping lever 14 may be returned to its initial position as a result of spring action, when the release mechanism is no longer depressed.

The closing ring 7 is provided with a nose projection 7b which may be gripped by a stopping lever 20. The latter is rotatably mounted on a pin 21 secured to the housing of the camera. A tension spring 22 tends to rotate the lever 20 in a clockwise direction. An electromagnet 23 is mounted within the vicinity of the lever 20, and, when energized, acts upon the lever in manner opposite to that of the spring 22.

The release lever 15 can, in the commonly-known manner, actuate switches at different positions and at different specific instants of time, during the release process. The details of such a switching arrangement are well known in the art and are, therefore, not described further. The operation of a shutter as disclosed herein, is well known. Through rotation of the release lever 15 beyond the point of separation, the ring 1 becomes cocked in conjunction with ring 7. The lever 20 then drops within the path of the nose projection 7b, due to the action of the electromagnet 23. The ring 7 can, thereby, not follow the return motion of the ring 1, after separation from the lever 14. In view of the relative motion of the two rings with respect to each other, the shutter is opened. The executing motion of the opening ring is delayed, in the commonly-known manner through the escapement mechanism 4, 5, 6. As a result of a command signal derived from an electronic timing circuit, to be described, the electromagnet 23 is then released. The lever 20 thereby releases the nose 7b, due to the action of the spring 22. The closing ring 7 can thus follow the opening ring 1 in an essentially more rapid and unobstructed manner than the latter, until the shutter opening is again closed through the diaphragm blades 11.

Figure 2:
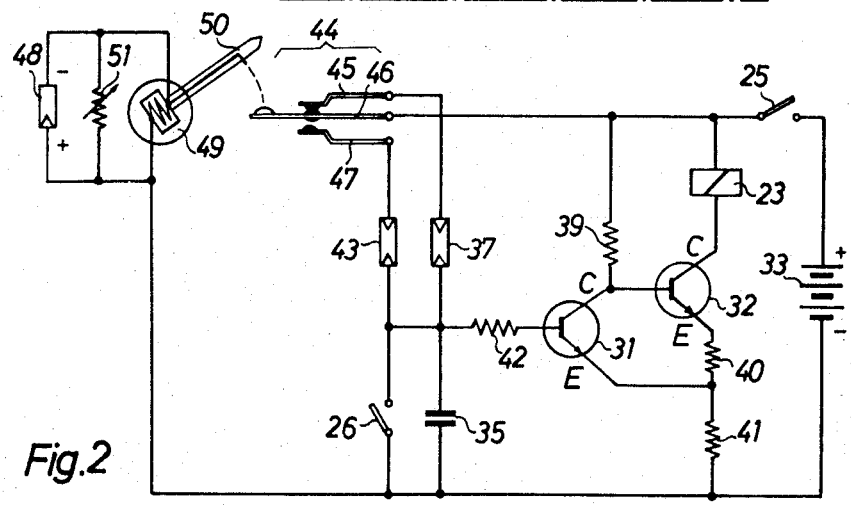
FIG. 2 is an electrical circuit diagram of one embodiment of the invention.

FIG. 2 shows the control circuit to be used in conjunction with the shutter of FIG. 1. The circuit is adapted to control the operation of automatic flash, exposure and includes the well known transistors 31 and 32, power supply 33, electromagnet 23, capacitor 35, with shorting switch 26, photoelectric element 37, main switch 25, and resistors 39, 40, 41 and 42. The control circuitry includes, furthermore, a second photoelectric element 43, having characteristics different from the element 37, a switch 44 having contacts 45, 46 and 47, a photocell 48, a variable resistor 51, and a sensing instrument 49 having a contact indicator 15.

In operation, and after the closing of the switch 25, the parts 31 to 42 control the diaphragm shutter of FIG. 1, within the range of diaphragm 2.8 and 1/30 seconds, to diaphragm 22 and 1/250 second. Within this program range, the control circuitry must be capable of a variation of $2^3$ in the release time of the electromagnet 23, corresponding to a variation of $2^9$ in the light intensity. This is made possible through the photoelectric element 37. If, under dim light conditions, the diaphragm is at 2.8 and 1/30 seconds, it is not possible to further increase the opening of the diaphragm. In order to provide for light control, under dim light conditions, by varying the exposure period, it is necessary to increase the exposure time by a factor of two, when the light intensity drops by a factor of two. The photoelement 43 is provided for this purpose, and the switching from the photoelement 37 to that of 43 takes place in the following manner:

The current delivered by the photocell 48 actuates the sensing element 49 and causes the latter to move as a function of the intensity of the current and hence of the prevailing light conditions. Initially, the action of the sensing element 49 is independent of the control circuitry, while it moves in a clockwise direction. Through this manner of operation, the sensing element 49 can, for example, also provide the average light intensity of the object to be photographed or indicate the diaphragm and/or time period when the light is relatively dim. The indicator 50 is held closely to the contact spring 46, through the action of the return spring of the instrument 49. The separation between the indicator 50 and contact spring 46 is adjusted so that they are in physical contact precisely when the light intensity corresponds to the condition when it is desired to switch from photoelectric element 37 to photoelectric element 43. This latter condition corresponds to the situation when diaphragm is 2.8 and 1/30 seconds. The variable resistor 51 may be set to provide for variable switching instants corresponding to different film speeds.

When the indicator 50 is in contact with the contact spring 46, and the switch 25 is closed, the power supply 33 provides a current through the coil of the instrument 49 which is greater and oppositely directed to the current resulting from the photocell 48. As a result, the indicator 50 bears firmly against the contact spring 46 and moves it against the contact spring 47. The circuit between contact springs 46 and 45 is thereby opened. Accordingly, the photoelectric element 43 is switched into the circuit and the photoelectric element 37 is switched out of the circuit. When the release rod 27 is no longer depressed, the switch 25 becomes opened thereby interrupting the circuit through the power supply 33. The instrument 49, therefore repositions itself again in correspondence with the light intensity of the object to be photographed. Under these conditions the indicator 50 is again separated from the contact spring 46.

The instrument 49 serves essentially the purpose of a light controlled switch having a single switching point. The instrument 49 has thus simpler usage than in the more conventional applications, and can, therefore, be of simpler design and construction.

With the closing of the switch 25, through the release rod 24, the control circuitry is connected to the power supply or battery 33. Depending upon the charged state of the capacitor 35, one of the two transistors 31 and 32 conducts. When the exposure process begins, the switch 26 becomes momentarily closed, as a result of the cam rise 1b on the opening ring 1. In this manner, the voltage across the capacitor is zero, at the beginning of the exposure period. The transistor 31 is, thereby, cut off since equal potentials prevail both at its base and its emitter. At the same time, the transistor 32 conducts and energizes the electromagnet 23 which attracts and holds the stopping lever 20. Depending upon the intensity of the light, the capacitor 35 is charged from either the photoelectric element 37 or 43. Discharging process takes place so the transistor 31 becomes conducting and the transistor 32 becomes cut off. When the latter situation occurs the electromagnet 33 becomes deenergized, the lever 20 becomes released, and the shutter becomes thereby closed. As a result of this sequence of events, the exposure period is completed.

The photoelectric element 37 is selected so that it provides the charging capacitor 35 with current during the triangular-shaped opening process of the shutter. When taking long exposure photographs wherein the illumination diaphragm is, at the beginning, approximately trapezoidal shaped, the photoelectric element 43 is instrumental in determining the time. If a shutter in accordance with FIG. 1 is used in conjunction with these conditions, a definite error enters into the diaphragm and timing control. This error may be maintained substantially small through a specific design of the photoelectric element 43. If, in the event, the error is totally compensated, it is sufficient that the escapement mechanism be made ineffective through the switching arrangement. Thus, the indicator 50 may, for example, actuate a lever which turns the pawl 6 about its axis so that it is outside of the path of motion of the teeth on the ratchet wheel 5. With the release of the camera, thereby, the shutter opens rapidly to its maximum opening, and approximates a trapezoidal-opening guide line having steep ends.

Figure 3:
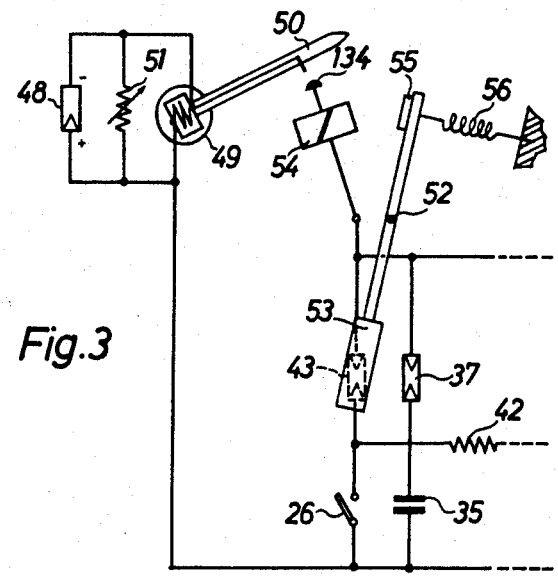
FIG. 3 is a functional schematic diagram of a second embodiment of the invention.

FIG. 3 shows another embodiment in which the photoelectric elements 37 and 43 are not associated with any switching arrangements. The two photoelectric elements are, herein, substantially in parallel to each other and the photoelectric element 43 is covered, at all times, by an opaque mask 53, when the light conditions are sufficient for taking simple exposures. The mask 53 is secured to a lever which rotates about the pivot 52. As a result of these conditions affecting the photoelectric element 43, the latter exhibit a sufficiently high resistance to make its conductivity substantially negligible in the circuitry.

If the light intensity attains the value whereby the sensing instrument 49 together with its indicating arm 50 bears against the contact 134, the electromagnet 54 becomes energized. With the attraction of the armature 55 to the electromagnet 54, thereby, the opaque mask 53 is turned, against the action of the spring 56, and placed upon the photoelectric element 37. At the same time the photoelectric element 43 becomes exposed to the light, and thereby assumes control of the electronic circuitry in place of the photoelectric element 37. It is also possible with this construction to provide the instrument 49 with indicating means whereby the photographer in informed, beforehand, if the exposures are to be taken with a tripod and pure timing control, or if the camera is operating in the region corresponding to program control and without the use of a tripod. It is also quite possible to cover the photoelectric element only partially with the mask 53, so that the former may exhibit varying characteristics as may be required.

It is also feasible to cover one of the photoelectric elements through means of a slider actuated by the user of the camera. At the same time, the design may be such that the lever rotating about pivot 52 actuates the contact 46 through an escapement mechanism. The arrangement may be such that the escapement mechanism becomes operative as a result of a feeler pin actuated by the tripod. Such a design is especially advantageous when the tripod may be telescopically extended from within the camera housing.

Figure 4:
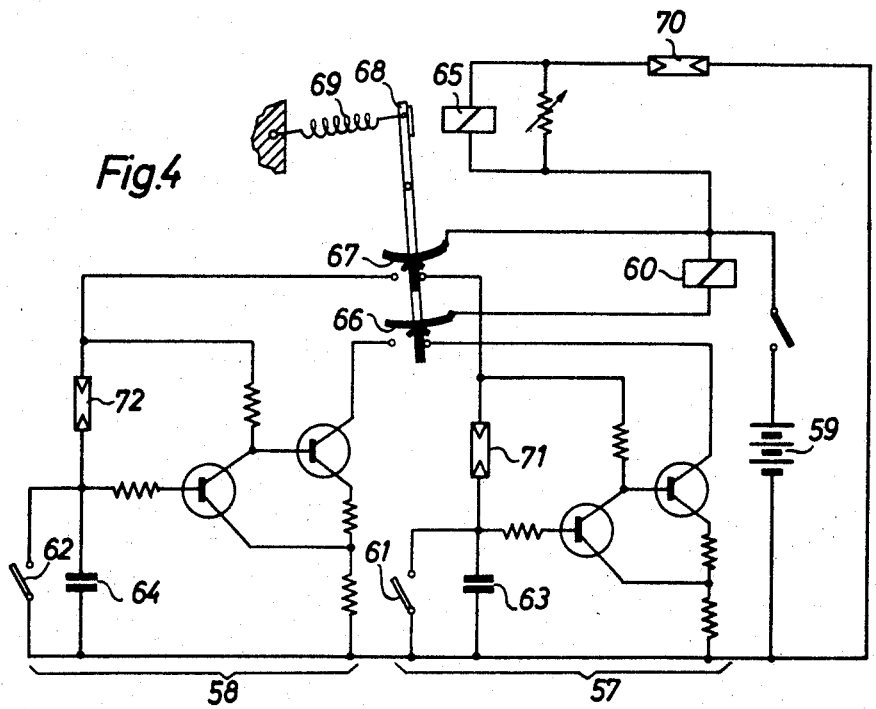
FIG. 4 is an electrical circuit diagram of a third embodiment of the invention.

FIG. 4 shows another embodiment having two separate electronic circuits 57 and 58, both energized by a single power supply 59. Both of these circuits operate upon the electromagnet 60 for controlling the shutter. Each of these control circuits has a switch 61 or 62 actuated by the shutter. When the switches 61 and 62 are in their open positions, the capacitors 63 and 64, respectively, may be charged. The switches 61 and 62 are always actuated simultaneously.

FIG. 4 also shows a solenoid 65 which operates two switching contacts 66 and 67. The switching contacts are operated as a result of the attraction of the armature 68 to the solenoid 65, and against the action of the spring 69. The current through the solenoid 65 is delivered by the power supply 59, and controlled by the photoelectric element 70. The solenoid 65 is controlled by the photoelectric element 70 so that when a specific threshold is attained, the armature 68 is attracted to the solenoid and the cirucit 58 operates the electromagnets 60, instead of the circuit 37.

The circuit 57 includes the photoelectric element 71 and has design characteristics corresponding to pure timing control. The circuit 58 includes another photoelectric element 72 and provides, on the other hand, the desired program control when the illumination is substantially bright and a tripod is not being used. The operational principles of the circuits 57 and 58 correspond to the circuitry illustrated in FIG. 2. This same design is of advantage when applied to an embodiment having an integrated arrangement. At the same time, the circuits may differ from each other in fundamental aspects. The exemplary embodiment, as illustrated is not restricted to two specific control circuits.

A hybrid-like control having, within the camera, a conventional sensing mechanism and electronic circuitry, is illustrated in FIGS. 5 and 6. FIG. 5 illustrates the design details of the shutter and the sensing mechanism. FIG. 6 shows, on the other hand, the associated switching circuitry.

In accordance with FIG. 6, corresponding to a usual type of electronic light control, the arrangement includes transistors 84 and 85, electromagnet 86, photoelectric element 87, capacitor 88, bridging switch 89, power supply 90, resistors 91, 92, 93 and 94, and the main switch 95 actuated by the release mechanism of the camera. The circuit, moreover, includes a second power supply 96, a sensing or meter type of instrument 97, a variable resistor 98 to attain standard settings, and a switch 99. The latter operate in conjunction with the aforementioned photoelectric element 87 as a commonly-known light sensing circuit, so that the meter 97 may indicate the light intensity, in the conventional manner. The switch 99 is coupled to the switch 95 through the coupling rod 100, in the manner whereby the light sensing circuit is activated upon actuation of the camera release mechanism, and prior to the closing to the switch 95.

It is also quite feasible to maintain the switches 95 and 99 separated from each other and to connect the light sensing circuit either separately through the camera release mechanism, or through the photographer, prior to taking the exposure. The light sensing circuit may also be solidly connected into the arrangement so that the camera user, upon release of the shutter, does not have to wait for the expiration of the oscillations associated with the meter 97. It is also possible to operate the meter 97 through the main battery 90.

The sensing or meter instrument 97 carries an indicator 101, similar to the construction of the instrument 49 in FIG. 2. At low light intensities, the indicator bears against the contact 102. When the release rod 24 is depressed and the switch 95 is thereby closed, a large current, delivered by the power supply 96, flows through the meter 97 and causes the indicator 101 to bear firmly against the contact 102. In this manner, good electrical contact between the indicator 101 and the contact 102 is assured. Although the instrument 49 shown in FIG. 2 is of simple construction which has to carry out only a single function, the instrument 97 is a full-ranged light-sensing device having completely adjustable characteristics and provisions for light control.

FIG. 5 is an isometric representation of the instrument 97, indicator 101, and the contact 102. The diagram, furthermore, includes the bridging switch 89, actuated by the shutter, the electromagnet 86, and the escapement mechanism 111 operating in conjunction with the spring 112. Aside from the commonly-known parts including the sensing follower 103 for the position of the indicator 101, and transmitting lever 104, FIG. 5 also shows the newly designed parts. FIG. 5, moreover, shows the commonly-known shutter with two identically oriented sector rings 105 and 106, two shutter sectors 107 and 108 (the third one is not shown), a regulator for the diaphragm opening 109, and a conventional mechanical escapement mechanism designated by the reference numeral 110. The escapement mechanism 110 and the diaphragm positioning mechanism (not shown) for regulating the diaphragm opening 109 are controlled by the transmission lever 104, through the linkage schematically represented by the dotted line directed from the lever 104 to the escapement mechanism 110. The arrangement with respect to the sensing mechanism of the instrument 97 is such that when the light intensity is high, the diaphragm opening is made small and the exposure time is maintained substantially short. When on the other hand, the light intensity is low, the diaphragm opening is large and the exposure times are relatively long.

In the operation of the embodiments of FIGS. 5 and 6, the light sensing circuit becomes activated upon depression of the release rod of the camera and the closing of the switch 99. The instrument 97 is actuated in accordance with the prevailing light conditions, and, upon further depression of the release rod, the indication of the instrument is transmitted in the commonly-known manner for controlling the illumination in a manner similar to that of automatic cameras. The closing of the switch 95, due to the camera release mechanism, and the closing of the switch 89, due to the shutter, remain, under sufficient light conditions within the region wherein the use of a tripod is not necessary. The contact members 101 and 102 do not, thereby, bear against each other, and the electronic circuitry remains unactivated. The armature 111 of the electromagnet 86 is immediately released again after the release rod has been actuated, and drops outside of the path of motion of the shutter nose 112. Under these conditions of the transistor 84 is cut off, and the currents through resistors 91 and 62 are negligibly small in connection with the instrument 97. After a sensing and program control step, the entire operation is executed in the commonly-known manner without the participation of the electronic circuitry within the framework of the invention. It is desirable that such sensing-program control be operable as a function of the diaphragm and/or time. Such an arrangement is taught in the German Patent No. 1,185,055 wherein the diaphragm alone is varied at high lighting intensities and both the diaphragm and time are varied for intermediate light conditions.

In conjunction with the timing control through the electronic circuitry such a camera has, thereby, three different control regions. The electronic light control enters automatically only when the light conditions are of such low intensity that the sensing mechanism is not operable. If the indicator 101 remains against the contact 102, upon depression of the release rod, the electronic circuitry becomes activated upon further depression of the release rod and the closing of the main switch 95. The indicator 101 may be adapted to provide the user of the camera with an indication in order to use a tripod or not. For example, the indicator 101 may be provided with a twin marker which may be displayed in the viewer (not shown) to provide the photographer with the proper instructions.

As a result of the pressure between the indicator 101 and the contact 102, electrical contact is assured, and the armature 81 remains attracted to the energized electromagnet 86, against the action of the spring 112. The opening of the shutter actuates, in the commonly-known manner, the bridging switch 89, and the charging process of the capacitor 88 commences thereby. Through the sensing process for the position of the instrument 97, the diaphragm opening is made maximum and the longest time interval is introduced. With the expiration of the longest time interval derived from the escapement mechanism, the closing ring 106 of the shutter is released. However, the closing ring will still be held by the armature 111 due to the energized state of the electromagnet 86. The closing ring is first about to close when the armature 111 is released upon the deenergizing of the electromagnet 86.

The mechanical and electronic control exposure times overlap without interfering with each other and the longest of the two exposure times is the effective one, disregarding the limiting cases.

Figure 7:
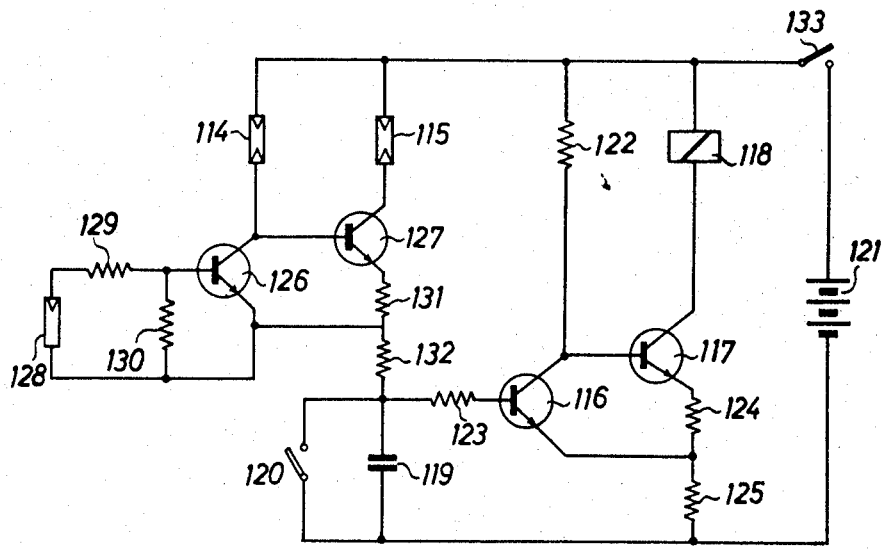
FIG. 7 is an electrical circuit diagram of a still further embodiment, in accordance with the invention.

FIG. 7 shows an embodiment with a photoelectric arrangement operating in conjunction with the other photoelectric arrangements. The different control functions are derived here, (similar to that in FIG. 2) from two different photoelectric elements 114 and 115. The timing section of this electronic circuit includes the transistors 116 and 117, the electromagnet 118, the capacitor 119, the bridging switch 120, the power supply 121, and the resistors 122, 123, 124 and 125. In addition to these components, used in the preceding embodiment, are two further transistors 126 and 127, a photocell 128, and four resistors 129, 130, 131 and 132. In operation, the photocell 128 provides a variable current dependent upon the intensity of the light at the object to be photographed. This current flows through the resisotrs 129 and 130, and produces a potential difference between the base and the emitter and the transistor 126. This potential difference may be scaled so that it controls the transistor 126 when the light intensity is sufficient to permit usage of the camera without a tripod.

If, now, the main switch 133 is closed upon the release of the camera, the current delivered by the power supply 121 flows through the photoelectric element 114, transistor 116 and resistor 132, towards the timing capacitor 119. Transistor 127 is thereby cut off and accordingly negligible current flows through the photoelectric element 115. The transistors 126 and 127 operate interchangeably in a manner similar to that associated with transistors 116 and 117. It is also reasonable to design the two groups of circuits in an identical manner. The photoelectric element 114 has the characteristics required for program control when the camera is used without a tripod. In this manner the electromagnet 118 is controlled in relation to light conditions in the manner already described.

When, on the other hand, the light intensity is relatively low, the potential difference across the resistor 130 is insufficient to control the transistor 126. Under these conditions the transistor 127 conducts, and upon closing of the main switch 133, current flows through the photoelectric element 115, transistor 127, and the resistors 131 and 132. The photoelectric element 115 has the characteristics required for long exposure times. Thus, when the light intensity is quite low, implying poor timing control, the exposure is accomplished in the proper manner.

The preceding embodiments are not restricted to the paritcular designs and interconnections described. In paritcular, it is possible to replace the circuits described with others having identical characteristics and producing the same results. At the same time it is possible to improve the circuits disclosed, through supplementary components including resistors, capacitors, inductors, and transistors. The circuits may be in the form of integrated circuit design. In place of the two illustrated electronic control circuits, three circuits may be provided,. Analogous to the functional arrangement of the exemplary embodiments, one of these circuits may provide for poor timing exposures corresponding to program control with sensor or meter measurements. The second electronic circuit may be designated to operate in the region corresponding to time and diaphragm control. The third one of the circuits may then be made operable in the region corresponding to diaphragm control. The light sensors may be operated in conjunction with conventional light selectors or may be replaced with other photoelectric elements providing similar results. In all circuits furthermore, it is possible to test the battery by replacing a photoelectric element with a fixed resistor.

It will be understood that each of the elements described above, or two or more together, may also find a useful application in other types of photographic cameras differing from the types described above.

While the invention has been illustrated and described as embodied in photographic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a camera, an exposure control arranged to provide a range of exposure time and a range of aperture sizes comprising, in combination, first photoelectric control means operative to select the aperture size as a function of the intensity of scene light when such intensity is relatively high above a predetermined level; second photoelectric control means operative to select the exposure time as a function of the intensity of scene light when such intensity is relatively low below said predetermined level; and a light-sensitive switching means connected to said first and second control means and exposed to scene light for switching from one to the other of said photoelectric control means depending on the intensity of scene light, so that said first photoelectric control means is operative when said scene light is above said predetermined level, and said second photoelectric control means is operative when said scene light is below said predetermined level.

2. An exposure control as defined in claim 1 including a timing circuit associated with said photoelectric control means and comprising a storage capacitor for storing an electrical charge; at least two photoelectric elements each associated with one of said control means connected to said capacitor means for charging thereof; and electromagnetic means operable by said timing circuit and acting upon said exposure control.

3. The exposure control as defined in claim 2 wherein said storage capacitor means comprises two capacitors.

4. An exposure control as defined in claim 1 including a diaphragm for varying said aperture size; an escapement mechanism actuatable on said diaphragm; and electrical metering means for rendering said escapement mechanism ineffective prior to the beginning of the exposure with said camera.

5. An exposure control as defined in claim 4 wherein said electrical metering means is a rotatable instrument having a coil rotatable as a function of electrical current flowing therethrough, said coil being connected to said light-sensitive switching means.

6. An exposure control as defined in claim 5 including a switching means actuated by said rotatable instrument when said scene light is below said predetermined level.

7. An exposure control as defined in claim 6 including masking means for masking said photoelectric control means against scene light; electromagnetic means for operating said masking means and actuated by said rotatable instrument.

8. An exposure control as defined in claim 4 including two photoelectric timing circuits having different timing characteristics; a switching arrangement for connecting and activating the desired one of said photoelectric timing circuits; solenoid means for actuating said switching arrangement; and photoelectric means for operating said solenoid means as a function of scene light.

9. An exposure control as defined in claim 2 including a switching control circuit comprising a first transistor and a second transistor; photoelectric means connected to the collectors of said first and second transistors; storage capacitor means connected to the emitters of said first and second transistors; light sensitive means connected to the base of said first transistor for applying thereto a potential as a function of said scene light; and conducting means for connecting the collector of said first transistor with the base of said second transistor.

10. An exposure control as defined in claim 9 including compensating resistors connected to the base of said first transistor and to said light-sensitive means, said light-sensitive means being connected in series with the base emitter path of said first transistor.

11. An exposure control as defined in claim 4 including a blocking lever actuated by said escapement mechanism; a stopping lever acting upon said diaphragm; electromagnetic means for operating said stopping lever; and photoelectric means for energizing said electromagnetic means for regulating thereby the timing of the opening of said diaphragm.

References Cited

UNITED STATES PATENTS

| 3,348,460 | 10/1967 | Schmitt. |
| 3,362,309 | 1/1968 | Cooper et al. |
| 3,373,672 | 3/1968 | Ichijo et al. |

FOREIGN PATENTS

| 855,462 | 11/1960 | Great Britain. |

NORTON ANSHER, *Primary Examiner.*

JOSEPH F. PETERS, Jr., *Assistant Examiner.*

U.S. Cl. X.R.

95—64